(12) United States Patent
Willingham et al.

(10) Patent No.: US 7,357,631 B2
(45) Date of Patent: *Apr. 15, 2008

(54) APPARATUS FOR PLACING MOLD CHARGES IN A COMPRESSION MOLDING MACHINE

(75) Inventors: Wendell D. Willingham, Perrysburg, OH (US); Daniel L. Mattice, Columbia City, IN (US); David C. Thompson, Grabill, IN (US); B. Jack Rote, Sturgis, MI (US)

(73) Assignee: Owens-Illinois Closures, Inc., Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/431,797

(22) Filed: May 10, 2006

(65) Prior Publication Data

US 2007/0264380 A1 Nov. 15, 2007

(51) Int. Cl.
*B29C 43/34* (2006.01)
(52) U.S. Cl. .............. 425/397; 414/225.01; 414/752.1; 425/472
(58) Field of Classification Search ................ 425/397, 425/447, 472; 414/225.01, 752.1
See application file for complete search history.

(56) References Cited

U.S. PATENT DOCUMENTS 1,021,048 A 3/1912 Kadow (Continued)

FOREIGN PATENT DOCUMENTS

WO WO 2004/062874 7/2004

(Continued)

OTHER PUBLICATIONS

Database WPI Week 200581 Derwent Publications Ltd., London, GB; AN 2005-796683 XP002453301 (2pgs), Nov. 3, 2005.

*Primary Examiner*—James P. Mackey
(74) *Attorney, Agent, or Firm*—Reising, Ethington, Barnes, Kisselle, P.C.

(57) ABSTRACT

An apparatus for placing mold charges into a mold of a compression molding machine includes at least one mold charge pick-up cup for receiving a severed charge of molten plastic, a vacuum source for applying a vacuum to the pick-up cup to retain the mold charge in the cup, and a source of gas (such as air) under pressure for periodically applying gas to the cup to release the mold charge from the cup. In one exemplary embodiment, the vacuum source applies a continuous vacuum to the cup, and the source of gas under pressure periodically applies gas to the cup to overcome the continuous vacuum at the cup. In another exemplary embodiment, vacuum and gas under pressure, are alternately applied to the cup. The vacuum source preferably includes a vacuum generator coupled to the source of gas under pressure for generating the vacuum to be applied to the cup. The vacuum source preferably includes a vacuum pump coupled to the source of gas under pressure for generating the vacuum to be applied to the cup. The source of gas under pressure preferably includes a valve for periodically applying gas under pressure to the cup. The apparatus preferably includes a carrier for moving the cup from a source of severed charges of molten plastic to the mold of the compression molding machine, with the cup, the vacuum pump and the valve preferably being mounted on the carrier. The vacuum source preferably includes a vacuum limiter that also is mounted on the carrier.

6 Claims, 4 Drawing Sheets

U.S. PATENT DOCUMENTS

| | | |
|---|---|---|
| 2,199,140 A | 4/1940 | Peiler |
| 2,744,286 A * | 5/1956 | Carpenter et al. ........... 425/437 |
| 3,142,863 A * | 8/1964 | Mazzoni ..................... 425/437 |
| 3,184,296 A | 5/1965 | Schaich |
| 3,700,375 A * | 10/1972 | Rees ........................... 425/444 |
| 3,734,666 A * | 5/1973 | Guest et al. ................. 425/437 |
| 4,579,514 A * | 4/1986 | Repella ...................... 425/397 |
| 5,322,541 A | 6/1994 | Shimizu et al. |
| 5,344,202 A * | 9/1994 | Ramler et al. .............. 294/64.1 |
| 5,603,964 A | 2/1997 | Rote et al. |
| 5,807,592 A | 9/1998 | Alieri |
| 5,811,044 A | 9/1998 | Rote et al. |
| 6,368,094 B1 | 4/2002 | Dennis et al. |
| 6,422,854 B1 | 7/2002 | Dennis et al. |
| 6,478,568 B2 * | 11/2002 | Ingram ....................... 425/297 |
| 6,752,581 B1 * | 6/2004 | Lust et al. ............. 414/225.01 |
| 2004/0212128 A1 | 10/2004 | Balboni et al. |

FOREIGN PATENT DOCUMENTS

| | | |
|---|---|---|
| WO | WO 2004/096515 | 11/2004 |
| WO | WO 2006/138089 | 12/2006 |

* cited by examiner

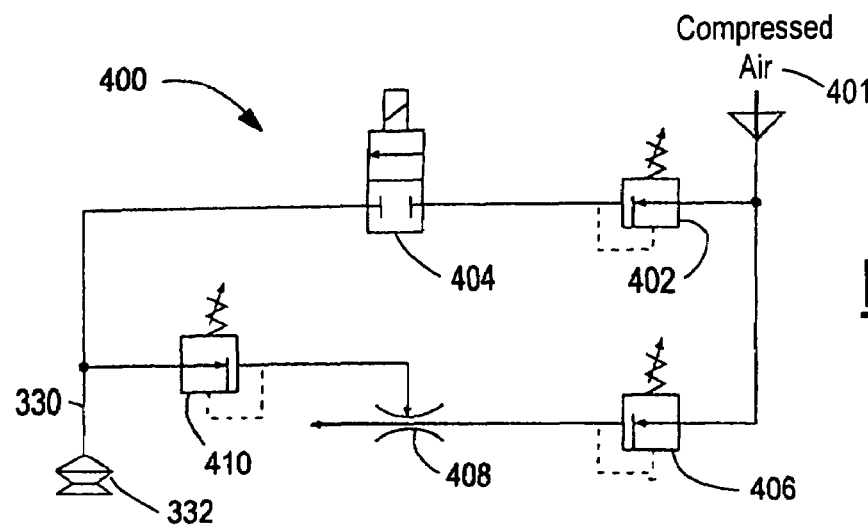
FIG. 3
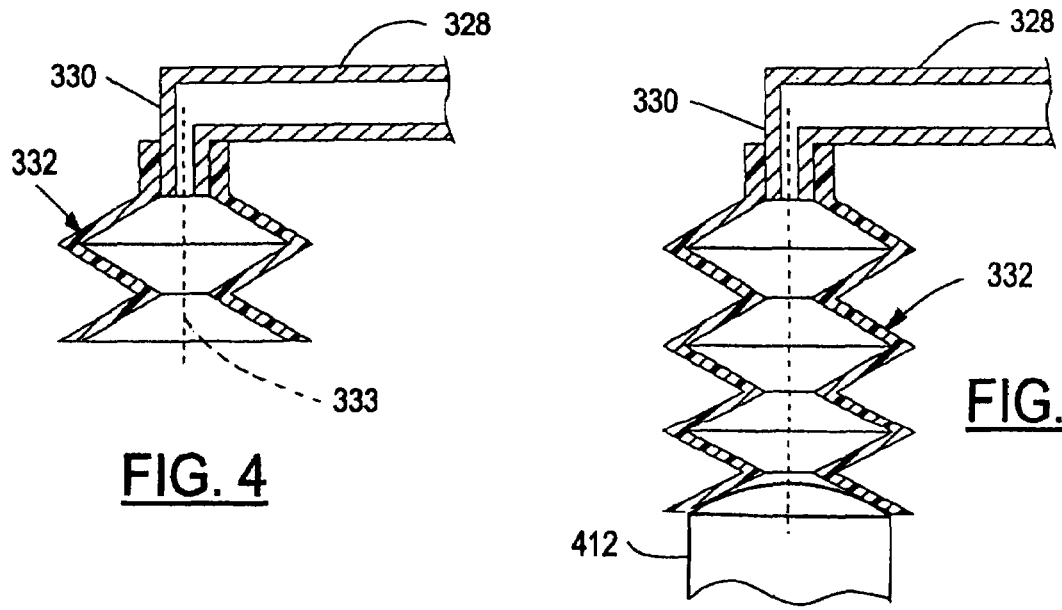
FIG. 4
FIG. 5
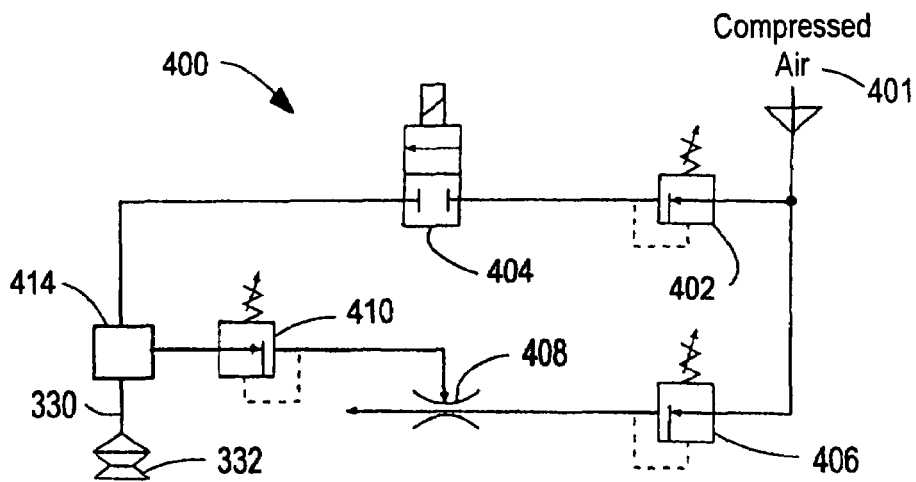
FIG. 6

US 7,357,631 B2

APPARATUS FOR PLACING MOLD CHARGES IN A COMPRESSION MOLDING MACHINE

BACKGROUND AND SUMMARY OF THE DISCLOSURE

The present disclosure relates to a machine for compression molding plastic articles, such as closure shells or sealing liners within closure shells, and more particularly to an apparatus for placing mold charges into the molds of the compression molding machine.

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the mold and a charge of molten plastic material is placed into the mold, and a closed position in which the mold sections are brought together to compression mold the shell or liner. In a liner machine, premade shells are placed in a nest when the mold sections are open, and a charge or pellet of liner material is placed within the mold before the mold is closed. U.S. patents that illustrate machines of this type for compression molding plastic closure shells include U.S. Pat. Nos. 5,670,110, 5,989,007, 6,074,583 and 6,478,568. U.S. patents that illustrate machines of this type for compression molding sealing liners within closure shells include U.S. Pat. No. 5,451,360. U.S. application Ser. No. 11/109,374 discloses a vertical wheel compression molding machine, which rotates around a horizontal axis, for compression molding closure shells or sealing liners within closure shells.

The present disclosure involves a number of aspects that can be implemented separately from or in combination with each other.

An apparatus for placing mold charges into a mold of a compression molding machine, in accordance with one aspect of the present disclosure, includes at least one mold charge pick-up cup for receiving a severed charge of molten plastic, a vacuum source for applying a vacuum to the pick-up cup to retain the mold charge in the cup, and a source of gas (such as air) under pressure for periodically applying gas to the cup to release the mold charge from the cup. In one exemplary embodiment, the vacuum source applies a continuous vacuum to the cup, and the source of gas under pressure periodically applies gas to the cup to overcome the continuous vacuum at the cup. In another exemplary embodiment, vacuum and gas under pressure, are alternately applied to the cup. The vacuum source preferably includes a vacuum generator coupled to the source of gas under pressure for generating the vacuum to be applied to the cup. The source of gas under pressure preferably includes a valve for periodically applying gas under pressure to the cup. The apparatus preferably includes a carrier for moving the cup from a source of severed charges of molten plastic to the mold of the compression molding machine, with the cup, the vacuum pump and the valve preferably being mounted on the carrier. The vacuum source preferably includes a vacuum limiter that also is mounted on the carrier.

The mold charge pick-up cup, in accordance with another aspect of the present disclosure, preferably is of annular bellows-shaped construction having a central axis. The bellows-shaped pick-up cup is resiliently bendable laterally of its central axis and resiliently compressible longitudinally of its axis to enhance pick-up of the mold charge and application of vacuum to the mold charge to carry the mold charge to the mold of the compression molding machine. The pick-up cup of annular bellows-shaped construction preferably is of elastomeric construction, most preferably silicone construction.

BRIEF DESCRIPTION OF THE DRAWINGS

The disclosure, together with additional objects, features, advantages and aspects thereof, will best be understood from the following description, the appended claims and the accompanying drawings, in which:

FIG. 3 is a schematic diagram of the pneumatic control system in the mold charge placement apparatus of FIG. 2;

FIG. 4 is a fragmentary sectional view on an enlarged scale of the mold charge pick-up cup in the apparatus of FIG. 2;

FIG. 5 is a fragmentary sectional view that is similar to that of FIG. 4 but illustrates a mold charge pick-up cup in accordance with another exemplary embodiment of the disclosure;

FIG. 6 is a schematic diagram of the pneumatic control system in a mold charge placement apparatus in accordance with another exemplary embodiment of the disclosure.

DETAILED DESCRIPTION OF PREFERRED EMBODIMENTS

The disclosures of U.S. application Ser. Nos. 11/109,374 and 11/156,115 are incorporated herein by reference.

Figure 1:
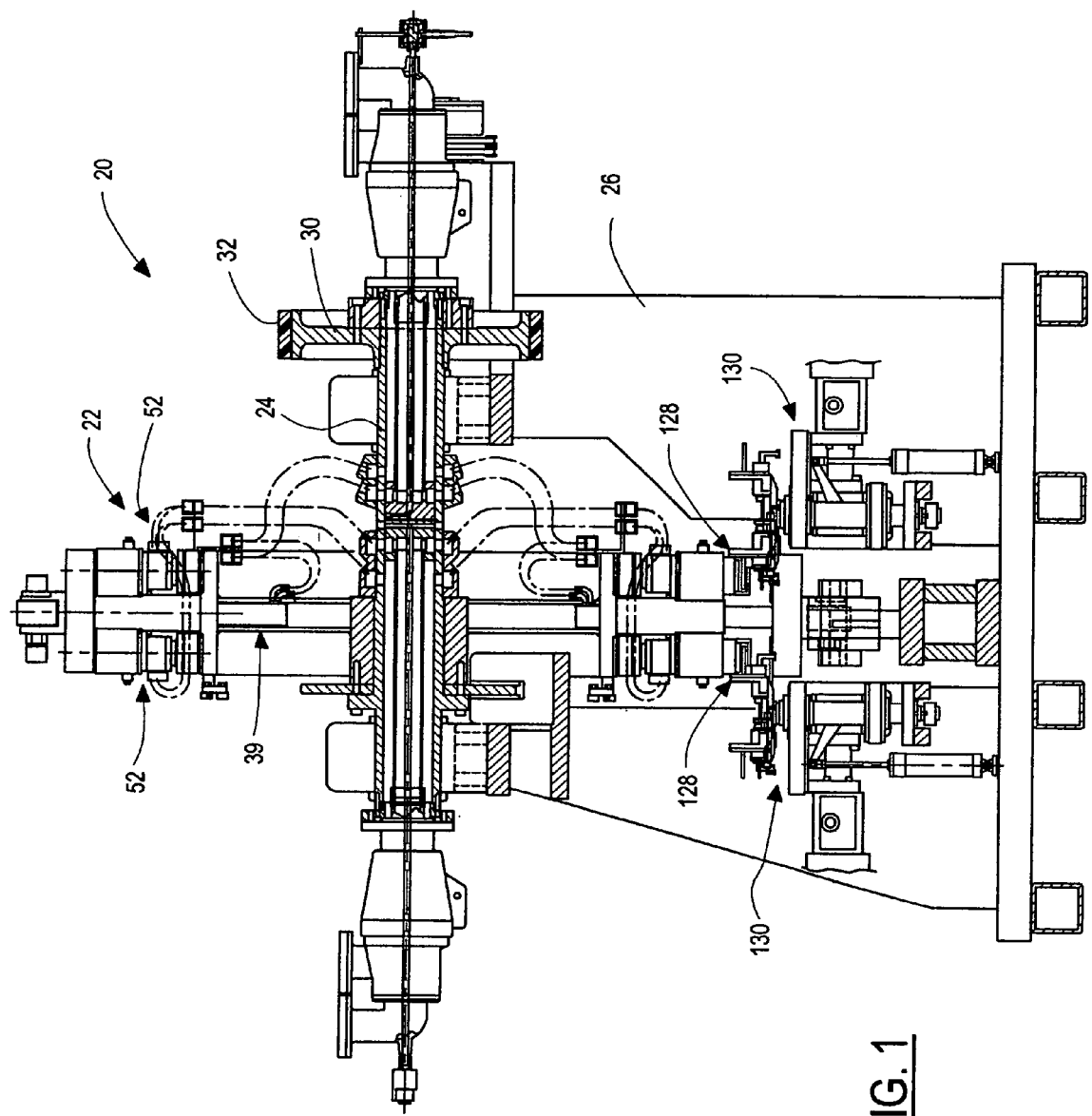
FIG. 1 is a front elevational view of a compression molding machine in accordance with one exemplary implementation of the disclosure.

FIG. 1 illustrates an exemplary machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced spokes. A plurality of angularly spaced molds 52 are disposed around the periphery of wheel 22, preferably on both sides of the wheel. All of the molds 52 preferably are identical. An apparatus 128 is provided for removing molded parts from the compression molding machine, and an apparatus 130 is provided for placement of mold charges into the molding machine.

Figure 2:
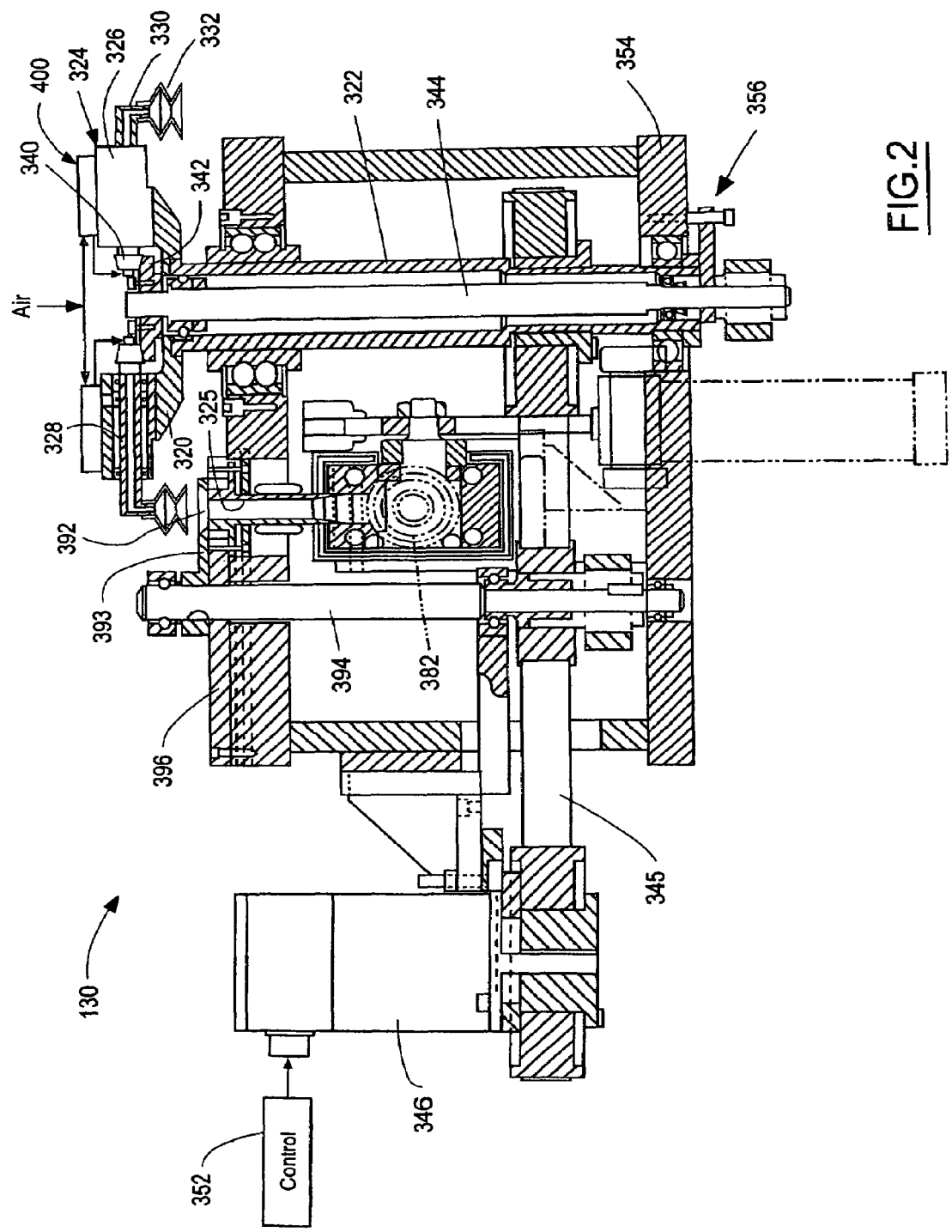
FIG. 2 is a sectional view on an enlarged scale of a mold charge placement mechanism in FIG. 1.

FIG. 2 illustrates an exemplary mold charge placement apparatus 130. An extruder nozzle 325 is parallel to but laterally offset from the axis of a sleeve 322 and a gear shaft 344. A pellet cutter knife 392 is coupled by an arm 393 to a blade shaft 394 for rotation along a plate 396 over the outlet of nozzle 325. The axis of shaft 394 is parallel to but laterally spaced from the axis of sleeve 322 and shaft 344. Sleeve 322 and shaft 394 are coupled by a belt 345 to a motor 346. Shaft 344 preferably is stationary in this embodiment. Shaft 344 preferably is coupled to frame 354 by a phase adjuster 356 for adjusting the "timing" of shaft 344 and gear 342 relative to collar 322 and carrier 320. Motor 346 is connected to a suitable control 352 for rotating collar 322 and carrier 320, and rotating drive shaft 394 and blade 392, in synchronism with wheel 22 (FIG. 1). Motor 346 may comprise an independently controllable servo motor. As an alternative, sleeve 322 and shaft 394 could be coupled by suitable gears, pulleys or the like to wheel 22 (FIG. 1). Hot melt from an extruder may be fed to nozzle 325 by a metering pump 382.

Carrier 320, which preferably is circular, is rotatably coupled to sleeve 322. At least one mold charge placement mechanism 324 is disposed at the periphery of carrier 320 for receiving severed mold charges from extruder nozzle 325, transporting the mold charges to molds 52 in machine 20 (FIG. 1) in sequence, and placing the mold charges into the molds. There preferably are a pair of mold charge cutting and placement mechanisms 324 positioned on diametrically opposite sides of carrier 320. A greater number of mechanisms 324 can be placed around carrier 320, preferably at equal angular increments. Mechanisms 324 preferably are identical in construction. Each mechanism 324 preferably includes a bearing block 326 mounted adjacent to the periphery of carrier 320, and a driven shaft 328 that extends through bearing block 326 for rotation around a second axis perpendicular to the axis of rotation of carrier 320. The axes of rotation of driven shafts 328 preferably are collinear. A placement arm 330 extends from the end of each shaft 328 at an angle to the axis of shaft rotation, preferably perpendicular to the axis of shaft rotation. A radially outwardly opening hollow mold charge pick-up cup 332 is mounted on the end of each arm 330. Thus, each cup 332 rotates around the axis of shaft 328, and shafts 328 are rotated around the axis of carrier 320. The inner end of each shaft 328 is coupled by a gear 340 to gear 342 mounted on the end of shaft 344. Thus rotation of shaft 344 is imparted by gears 340,342 to driven shafts 328, arms 330 and cups 332.

To the extent thus far described, mold charge placement apparatus 130 is similar to apparatus disclosed in above-referenced U.S. application Ser. Nos. 11/109,374 and 11/156,115, to which reference is made for a more detailed discussion. However, the described structure of molding machine 20 and placement mechanism 130 are given by way of example only in connection with an exemplary implementation of the present disclosure, and the present disclosure is by no means limited to such machine details.

A pneumatic control 400 (FIGS. 2 and 3) is coupled to each cup 332. Pneumatic controls 400 preferably are carried by respective associated bearing blocks 326 and are coupled to the hollow interiors of shafts 328 and arms 330. Each pneumatic control 400 is connected to a source 401 of compressed air. FIG. 3 is a schematic diagram of pneumatic control 400 in accordance with one exemplary embodiment of the present disclosure. Compressed air is fed through a pressure regulator valve 402 and a control valve 404 through hollow arm 330 to the hollow interior of cup 332. The compressed air also is fed through a pressure regulator valve 406 to a vacuum generator 408. Vacuum generator 408 may be a venturi-type vacuum generator, for example. The vacuum line of generator 408 is connected, preferably through a vacuum limiter 410, to arm 330 and cup 332. Vacuum limiter 410 preferably is adjustable. Thus, in this embodiment, vacuum is continuously applied to mold charge pick-up cup 332, while air under pressure is periodically applied to cup 332 by valve 404. Valve 404 may be a solenoid valve as shown or other suitably controlled valve for applying air under pressure to cup 332 at the appropriate time when the cup is located over a mold in the molding machine. The continuous vacuum assists cup 332 to pickup severed molten plastic charges and transport the charges to the machine molds in sequence. Application of air under pressure through valve 404 overcomes the vacuum force and assists placement of the mold charges into the molds in sequence. It is particularly advantageous, in the exemplary embodiments of the present disclosure, that the vacuum is generated on the mold charge placement mechanism, which means that only air (or other suitable gas) under pressure needs to be fed to the mechanism through to a suitably rotary union or the like.

FIG. 4 illustrates mold charge pick-up cup 332, in one exemplary embodiment of the disclosure, as comprising an annular one-piece bellows-shaped body secured to the end of arm 330. The annular bellows-shaped body of cup 332 preferably is circumferentially continuous and symmetrical around the longitudinal central axis 333 of the cup. The bellows-shaped construction of the cup body makes the cup body resiliently flexible laterally of axis 333 and resiliently compressible longitudinally of the axis. This assists in allowing the vacuum cup to conform to the geometry of a severed charge pellet and to accommodate minor misalignment between the axis of the pellet and the axis 333 of the cup. FIG. 5 illustrates a modified pick-up cup 332, which is axially elongated as compared with cup 332 but otherwise is of similar one-piece bellows-shaped construction. The number of corrugations in pick-up cup 332 in FIG. 5 makes the pick-up cup more axially resiliently compressible and laterally resiliently flexible than the cup of FIG. 4. Cups 332 preferably are of flexible resilient elastomeric construction such as silicone, which can contact hot melt severed from the extruder without distortion. A severed charge 412 of molten plastic is illustrated schematically in FIG. 5 being gripped by cup 332 for transport to the machine mold. Application of air under pressure through shaft 328 and arm 330 assists release of the mold charge into a mold.

Figure 7:
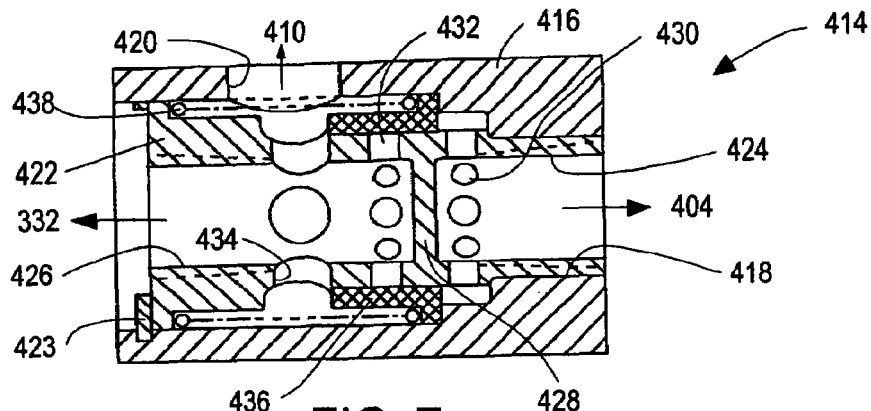
FIGS. 7-10 are sectional views on an enlarged scale of the vacuum/air control valve in the embodiment of FIG. 6.
Figure 8:
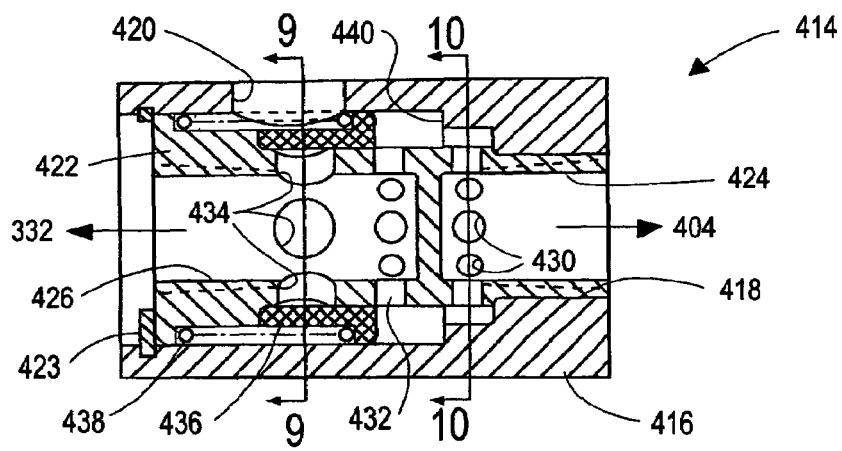
Figure 9:
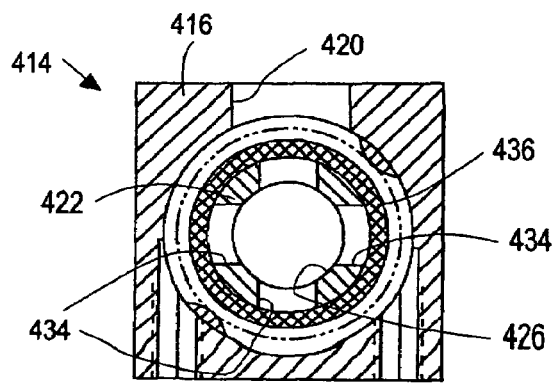
Figure 10:
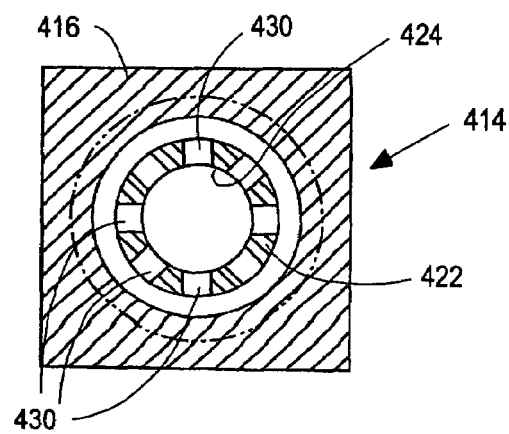

FIG. 6 illustrates a second embodiment of control system 400 in accordance with the present disclosure. The embodiment of FIG. 6 is similar to the embodiment of FIG. 3 except for the addition of a control valve 414 between cup 332 and valves 404,410. Valve 414 controls application of vacuum and air under pressure to cup 332 so that vacuum and air under pressure are applied alternately to the cup. An exemplary embodiment of valve 414 is illustrated in FIGS. 7-10. A valve body 416 has a longitudinal passage 418 that communicates with a lateral opening 420. A valve insert 422 is non-movably mounted within passage 418 of valve body 416, such as by a retaining ring 423. Insert 422 has aligned axial passages 424 and 426 that are separated from each other by a lateral wall 428. At least one opening 430, and preferably a plurality of angularly spaced openings 430 extend through the sidewall of insert 422 from opening 424 adjacent to wall 428. At least one second opening 432, and preferably a plurality of angularly spaced second openings extend through the sidewall of insert 422 from opening 426 adjacent to wall 428. At least one third opening 434, and preferably a plurality of angularly spaced openings 434 extend through the sidewall of insert 422 from opening 426 at a position spaced from wall 428. A shuttle 436 is slidably mounted on the exterior of insert 422 and biased by a spring 438 against a shoulder 440 within body 416. Shuttle 436 normally covers openings 432 and uncovers openings 434 in insert 422, as shown in FIG. 7.

Opening 424 of insert 422 is connected to compressed air control valve 404 (FIG. 6). Opening 420 in valve body 416 is connected to vacuum limiter 410 (FIG. 6), or to vacuum generator 408 in the absence of the optional vacuum limiter. Opening 426 of insert 422 is connected to mold charge pick-up cup 332 (FIG. 6). In the absence of air under pressure from valve 404, shuttle 436 is in the spring-biased position of FIG. 7, and vacuum is applied to cup 332 through opening 420 in valve body 416, and openings 434 and 426 of insert 422. When air under pressure is applied to insert opening 424 from valve 404 (FIG. 6), the air under pressure is applied to shuttle 436 through openings 430, moving shuttle 436 to the position of FIG. 8 against the force of spring 438. Application of vacuum to cup 332 is then blocked by blockage of openings 434 in insert 422. In the meantime, air under pressure now is fed through openings 430 and 432 to insert opening 426, and thence to cup 332. Thus, in the embodiment of FIGS. 6-10, vacuum and air under pressure are applied alternately to the mold charge pick-up cup, rather than simultaneously to discharge the mold charge as in the embodiment of FIG. 3.

The disclosure thus has been presented in conjunction with several exemplary embodiments, and a number of additional modifications and variations have been discussed. Other modifications and variations readily will suggest themselves to persons of ordinary skill in the art in view of the foregoing discussion. For example, although the disclosure has been presented in conjunction with a horizontal axis vertical wheel compression molding machine, it will be apparent that the mold charge placement apparatus of the present disclosure can be used equally as well in conjunction with vertical axis carousel-type machines for placing mold charges into the molds of the machine. The disclosure is intended to embrace all such modifications and variations as fall within the spirit and broad scope of the appended claims.

The invention claimed is:

1. Apparatus for placing mold charges into a mold of a compression molding machine, which includes:
   at least one mold charge pick-up cup for receiving a severed charge of molten plastic,
   a carrier for moving said cup from a source of severed charges of molten plastic to a mold cavity of a compression molding machine,
   a vacuum source for applying vacuum to said pick-up cup to retain a mold charge in said cup, and
   a source of gas under pressure including a valve for periodically applying gas under pressure to said cup to release a mold charge from said cup,
   said vacuum source including a vacuum generator and a vacuum limiter coupled to said source of gas under pressure for generating a continuous vacuum,
   said cup, said vacuum generator, said vacuum limiter and said valve being mounted on said carrier,
   said carrier including a plate for rotation around a first axis, a placement arm mounted on said plate for rotation around a second axis perpendicular to said first axis, said mold charge pick-up cup being mounted on an end of said placement arm for placing mold charges into molds adjacent to a periphery of said plate.

2. The apparatus set forth in claim 1 including a control valve coupled between said mold charge pick-up cup, and said vacuum source and source of gas under pressure, for applying vacuum and gas under pressure alternately to said cup.

3. The apparatus set forth in claim 1 including a pair of said placement arms extending from said plate and a mold charge pick-up cup on an end of each of said arms.

4. The apparatus set forth in claim 1 wherein said mold charge pickup cup is of elastomeric construction.

5. The apparatus set forth in claim 4 wherein said mold charge pick-up cup is of bellows-shaped construction having a central axis, said bellows-shaped construction being resiliently flexible laterally of said central axis and resiliently compressible longitudinally of said central axis.

6. The apparatus set forth in claim 5 wherein said mold charge pick-up cup is of silicone construction.

* * * * *